No. 798,522. PATENTED AUG. 29, 1905.
F. A. MILLET.
STUBBLE SHAVER.
APPLICATION FILED APR. 24, 1905.
2 SHEETS—SHEET 1.
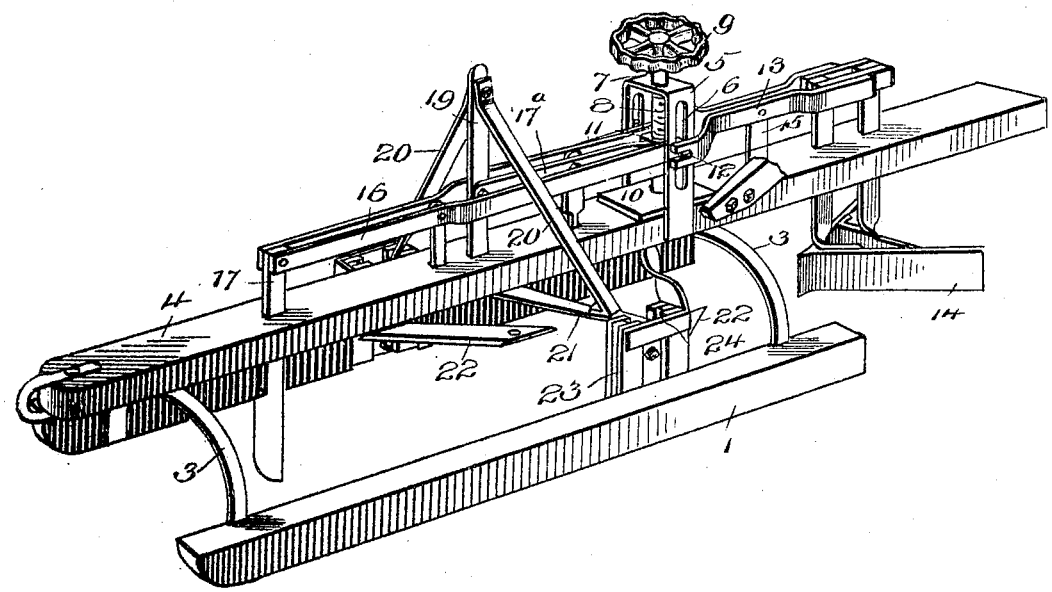
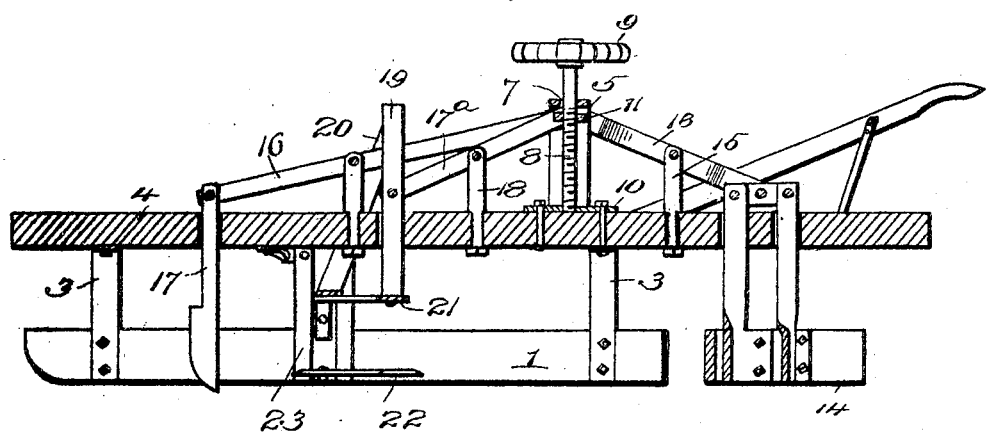
Witnesses
Inventor
Frank A. Millet,
By Mason, Fenwick & Lawrence
Attorneys No. 798,522. PATENTED AUG. 29, 1905.
F. A. MILLET.
STUBBLE SHAVER.
APPLICATION FILED APR. 24, 1905.

2 SHEETS—SHEET 2.

UNITED STATES PATENT OFFICE.

FRANK A. MILLET, OF GRAMERCY, LOUISIANA.

STUBBLE-SHAVER.

No. 798,522.  Specification of Letters Patent.  Patented Aug. 29, 1905.

Application filed April 24, 1905. Serial No. 257,238.

*To all whom it may concern:*

Be it known that I, FRANK A. MILLET, a citizen of the United States, residing at Gramercy, in the parish of Orleans and State of Louisiana, have invented certain new and useful Improvements in Stubble-Shavers; and I do hereby declare the following to be a full, clear, and exact description of the invention, such as will enable others skilled in the art to which it appertains to make and use the same.

My invention relates to an improvement in stubble-shavers.

The object of my invention is to provide an improved implement in which the knives may be expeditiously raised from and lowered to the ground and in which the accomplishment of this object is facilitated by a single means so placed on the implement that the operation of the knife-blades, fluke, and colter is accomplished by one and the same motion at one and the same time.

In implements of similar construction hitherto produced the fluke and the horizontal blades have been pivotally attached to a lever through intermediate means, which lever had at a point predetermined a fulcrum by means of which the fluke as well as the horizontal blades were raised or lowered, as may have been required. The vertical knife or colter has usually been made stationary to the forward end of the main beam in that it was wedged or in any other manner secured to said beam. By reason of this fact the said knife-blade or colter could not be adjusted to suit any emergency which its use required, and consequently does not fulfil the object for which an implement of this character is intended.

I have devised an implement by means of which the entire stubble-cutting mechanism—viz., the colter, the horizontal blades, and the fluke—as well as the entire manipulating means are arranged and positioned so that by means of hand-wheel or other suitable attachment the complete operating-levers are made to rise and lower to any desired height or depth.

My invention consists, furthermore, in such features, details of construction, and combination of parts as will be described in connection with the accompanying drawings, in which—

Figure 3:
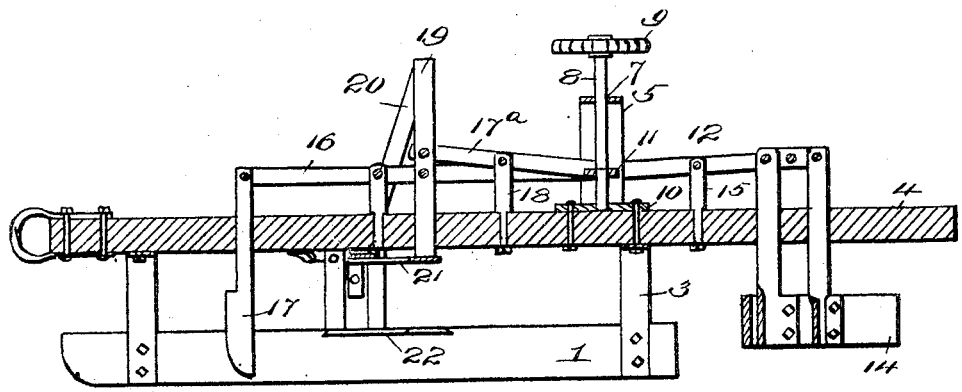
Figure 4:
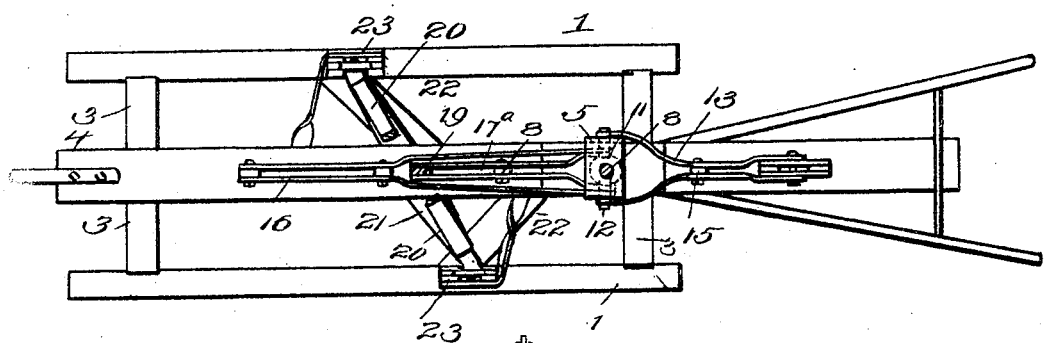
Figure 5:
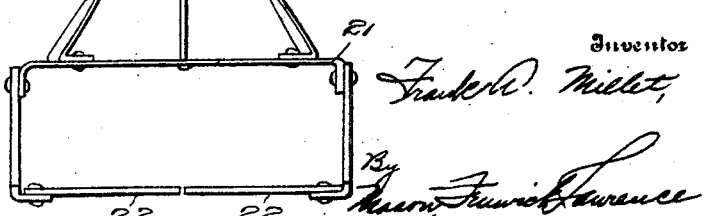

Figure 1 is a perspective view; Fig. 2, a sectional side elevation; Fig. 3, a like view; Fig. 4, a top plan view, and Fig. 5 a detail elevation of one of the parts.

Referring more in detail to the drawings, 1 represents a pair of shoes or runners arranged to slide over the surface of the ground. Attached to these runners 1 are a series of arched frames 3, secured one to each end of the runners and rigidly fixed thereto. The arched frames 3 carry a longitudinal beam 4, to the rearward end of which is fixed a pair of handles for guiding the implement.

5 represents an inverted-U-shaped frame rigidly mounted on the main beam 4 and provided with lateral vertical slots 6. Said frame has provided in its upper portion an opening 7, through which a screw-shank 8 is arranged to extend, the extremity of said shank being provided with a hand-wheel 9, which is secured thereto. The lower portion of the shank is seated upon or swiveled to a plate 10, which is made fast to the upper surface of the main central beam 4. A cross-head 11, having laterally-extending arms 12, is mounted upon said shank 8 and arranged to be operated in a vertical direction. These laterally-extending arms project through the slot 6, provided in the U-shaped frame, the outward projection of said arm being arranged to support and operate a bifurcated lever 13, extending rearwardly of said frame and carrying a fluke 14, to which it is pivotally connected. This lever 13 is fulcrumed at or about its center, the point of fulcrum being indicated at 15. A similar lever 16 is loosely fixed to said cross-head 11, extending toward the forward end of the implement, said lever having pivotally connected thereto a colter 17, having its shank portion extending through the main beam 4. This lever 16 has a fulcrum at or about near its center. From the point of this fulcrum said lever 16 terminates in a bifurcation whose extremities loosely rest on the cross-head 11, by means of which the height or depth of the levers is determined. Within the bifurcation formed by the rearwardly-extending arms of said lever 16 is another lever 17$^a$, having centrally disposed thereof a fulcrum 18, fixedly secured to the longitudinal beam 4, said lever being capable of having free travel within the extended arms formed by the lever 16 and having at its end an upright arm 19, extending through the longitudinal beam 4. Attached to the upper extremity of this upright arm 19 are a series of downwardly and outwardly extending arms 20, said arms being connected at their lowest point by a horizontal bar 21, located beneath the main beam and forming, together with the downwardly and outwardly extending arms 20, substantially a yoke. This yoke carries a plurality of blades disposed horizontally of the implement, said blades being numbered 22. These are arranged to travel in a guideway 23, having grooves 24, the guideway being fastened to the runners or shoes of the implement and likewise secured to the beam of the implement by suitable means.

From the above description it will be obvious that since all of the levers have their respective ends joined to a common cross-head which is arranged to travel the movement of the lever will be simultaneous.

Having thus described my invention, what I claim as new, and desire to secure by Letters Patent of the United States, is—

1. In a stubble-shaver, the combination with a plurality of runners and a central beam supported thereby, of a plurality of horizontal and vertical cutters attached to a series of levers, said levers having their respective ends pivoted to a vertically-adjustable member whereby all of the cutters are simultaneously operated, and means for operating said member.

2. In a stubble-shaver, the combination with a plurality of runners and a central beam, of a series of horizontal and vertical cutters pivoted to a plurality of levers, said levers having their respective ends pivotally secured to a movable member, means for operating the movable member, and a guide for governing the travel of said movable member.

3. In a stubble-shaver the combination with a pair of runners, of arched frames secured to the runners, the central beam supported by the arched frames, the main lever pivoted to the colter and having its rear portion bifurcated and resting on a common support, an auxiliary lever within the bifurcation formed by the main lever, another lever extending toward the rear of the central beam and attached to a common support and means for simultaneously operating all of the levers.

4. In a stubble-shaver the combination with a pair of runners, of front and rear arched frames secured to the runners, a central beam supported by the arched frame, a colter-carrying lever, a horizontal knife-carrying lever and a fluke-carrying lever, the extremities of each of said levers being attached to a common point, and means for simultaneously operating the levers.

5. A stubble-shaver comprising a pair of runners, front and rear arched frames secured thereto and carrying a longitudinal beam, a frame mounted upon said longitudinal beam and having centrally disposed thereof a screw carrying a cross-head, and a plurality of levers having their extremities attached to said cross-head each lever carrying an implement, and means for simultaneously operating all of the levers.

6. A stubble-shaver comprising a pair of runners, front and rear arched frames secured to the runners, a central beam supported by the arched frames, an inverted-U-shaped frame supported by said central beam, said frame carrying a cross-head, a colter-lever attached to the cross-head, and having its rear portions bifurcated, a knife-carrying lever within the bifurcation formed by said colter-lever loosely fixed to said cross-head, a fluke-carrying lever having bifurcated arms engaging said cross-head, and means for simultaneously operating all of the levers, so as to adjust the blades to any desired height.

7. In a stubble-shaver the combination with a plurality of runners and a central beam, of a plurality of cutter-carrying levers mounted on said central beam, and having their respective ends pivotally secured to a vertically-movable member, means for guiding the travel of the movable member consisting of a frame having elongated slots provided in its sides, and means for raising and lowering the movable member.

In testimony whereof I have affixed my signature in presence of two witnesses.

FRANK A. MILLET.

Witnesses:
  GUSTAVE LEMLE,
  IRVING R. SOAL.